United States Patent
Holtmanns

(10) Patent No.: US 10,009,431 B2
(45) Date of Patent: Jun. 26, 2018

(54) METHODS AND APPARATUSES FOR LAWFUL INTERCEPTION THROUGH A SUBSCRIPTION MANAGER

(75) Inventor: Silke Holtmanns, Klaukkala (FI)

(73) Assignee: Nokia Technologies Oy, Espoo (FI)

( * ) Notice: Subject to any disclaimer, the term of this patent is extended or adjusted under 35 U.S.C. 154(b) by 240 days.

(21) Appl. No.: 14/118,215

(22) PCT Filed: Apr. 24, 2012

(86) PCT No.: PCT/IB2012/052059
§ 371 (c)(1),
(2), (4) Date: Nov. 15, 2013

(87) PCT Pub. No.: WO2012/160454
PCT Pub. Date: Nov. 29, 2012

(65) Prior Publication Data
US 2014/0075023 A1    Mar. 13, 2014

Related U.S. Application Data

(60) Provisional application No. 61/489,111, filed on May 23, 2011.

(51) Int. Cl.
*G06F 15/173* (2006.01)
*H04L 29/08* (2006.01)
(Continued)

(52) U.S. Cl.
CPC ............ *H04L 67/22* (2013.01); *H04L 63/306* (2013.01); *H04M 3/2281* (2013.01); *H04W 4/50* (2018.02); *H04W 8/18* (2013.01)

(58) Field of Classification Search
None
See application file for complete search history.

(56) References Cited

U.S. PATENT DOCUMENTS 4,782,509 A     11/1988 Shepard
6,122,499 A  *   9/2000 Magnusson ........ H04B 7/18567
                                              379/35
(Continued)

FOREIGN PATENT DOCUMENTS

WO     2001/060098 A1     8/2001

OTHER PUBLICATIONS

3rd Generation Partnership Project, Technical Specification TS 33.108 Handover Interface for Lawful Interception (LI), Mar. 2011, 3GPP, vol. 10.3.0, p. 21.*

(Continued)

*Primary Examiner* — Phyllis A Book
(74) *Attorney, Agent, or Firm* — Mintz Levin Cohn Ferris Glovsky and Popeo, P.C.

(57) ABSTRACT

Methods, apparatuses, and computer program products are herein provided for lawful interception through a subscription manager. In some embodiments, methods, apparatuses, and computer program products provide user subscription data to an agency, operator, or service provider in response to receiving a lawful interception request. A method may include receiving an interception request comprising a user's name from at least one operator. The method may further include determining, by a processor, an operator specific access code associated with the user's name. The method may also include providing the operator specific access code to the operator. Corresponding apparatuses and computer program products are also provided.

14 Claims, 7 Drawing Sheets

(51) Int. Cl.
*H04W 8/18* (2009.01)
*H04M 3/22* (2006.01)
*H04L 29/06* (2006.01)
*H04W 4/50* (2018.01)

(56) References Cited

U.S. PATENT DOCUMENTS

| | | | |
|---|---|---|---|
| 6,504,925 | B1 | 1/2003 | Schlachman et al. |
| 2002/0159578 | A1* | 10/2002 | Bern .................. H04L 63/306 379/219 |
| 2008/0280609 | A1* | 11/2008 | Imbimbo ............ H04M 3/2281 455/435.1 |
| 2009/0234845 | A1* | 9/2009 | DeSantis ............... H04L 43/026 |
| 2010/0062762 | A1* | 3/2010 | Muratore ............ H04Q 3/0025 455/432.1 |
| 2011/0055910 | A1* | 3/2011 | Attanasio ............ H04L 63/304 726/6 |
| 2011/0154181 | A1* | 6/2011 | Kawa .................. H04L 63/00 715/234 |
| 2011/0269430 | A1* | 11/2011 | Di Donato ............ H04W 12/02 455/412.2 |
| 2013/0210386 | A1* | 8/2013 | Perlin .................. H04L 63/12 455/411 |

OTHER PUBLICATIONS

International Search Report and Written Opinon received for corresponding Patent Cooperation Treaty Application No. PCT/IB2012/052059, dated Feb. 18, 2013, 13 pages.

3GPP TS 33.106 V10.0.0 (Jun. 2010); Lawful interception requirements.

"Embedded SIM Task Forcce Requirements and Use Cases 1.0", by GSMA Feb. 21, 2011.

3GPP TS 33.108 V10.3.0 (Mar. 2011) Handover interface for Lawful interception (LI).

Smart Cards; Embedded UICC; Requirements Specification ETSI Draft; SCPREQ (11) 0072-Draft_Embedded_UICC_Requirements_Specification, May 11, 2011, European Telecommunications Standards Institute (ETSI), 650 route des Lucioles; F-06921 Sophia-Antipolis; France.

S1-111298, "LS on Clarification to e-UICC uses cases and Requirements", by 3GPP SA WG1, 3 GPP TSG-SA WG1 Meeting #54 Xi'an, China, May 9-13, 2011.

"FCC Lightsquared to Deliver LTE Satellite Broadband", Signal News, Retrieved on May 8, 2015, Webpage available at : http://signalnews.com/fcc-lightsquared-to-deliver-lte-satellite-broadband174.

Walker, "Embedded SIMs and M2M Communications", ETSI Security Workshop, Jan. 20, 2011, pp. 1-9.

"Proposal to Clarify and Expand eUICC Definitions", ETSI TC SCP REQ ad hoc #113, SCPREQ(11)0047, Apple, Apr. 27-28, 2011, pp. 1-9.

"Lawful Interception (LI); Handover Interface for the Lawful Interception of Telecommunications Traffic", ETSI ES 201 671, V3.1.1, Oct. 2006, pp. 1-124.

Extended European Search Report received for corresponding European Patent Application No. 12788981.4, dated Apr. 15, 2015, 5 pages.

* cited by examiner

METHODS AND APPARATUSES FOR LAWFUL INTERCEPTION THROUGH A SUBSCRIPTION MANAGER

RELATED APPLICATION

This application was originally filed as PCT Application No. PCT/IB2012/052059 filed Apr. 24, 2012 which claims priority benefit from U.S. Provisional Application No. 61/489,111, filed May 23, 2011.

TECHNOLOGICAL FIELD

Example embodiments of the present invention relate generally to lawful interception of user subscription data and, more particularly, relate to methods and apparatuses for lawful interception through a subscription manager.

BACKGROUND

The modern communications era has brought about a tremendous expansion of wireline and wireless networks. Wireless and mobile networking technologies have addressed related consumer demands, while providing more flexibility and immediacy of information transfer. These networks provide users the ability to communicate and interact with each other across vast distances through devices such as phones or computers. Concurrent with the expansion of networking technologies, an expansion in computing power has resulted in development of affordable computing devices capable of taking advantage of services made possible by modern networking technologies. These devices, however, with their numerous capabilities, may require multiple subscriptions to many different operators and service providers.

Users of these devices may share important or vital information on these networks. As such, in some circumstances, an agency, such as a government agency (e.g., CIA, FBI, etc.) may wish to monitor network communications of a specific individual. Lawful interception of this kind, however, can be difficult with multiple subscriptions and multiple network connectivity for a specific user or device.

BRIEF SUMMARY

The complexity of multiple subscriptions for different networks and functions has brought about a new entity that can manage some or all of the subscriptions for a user/device. In particular, a subscription manager can maintain a database that stores all user subscription data for the all or some of the operators and/or service providers for a specific user/device. Moreover, the subscription manager provides a user with a single entity to contact to access many different networks for their device. In some cases, the user may not even be aware of which operator network and/or service provider network their device is accessing.

An additional benefit of a subscription manager is that a user's information, such as their name, may remain private from the operator and/or service provider. For example, the operator and/or service provider may only need the device identifier to grant access to their network for the device. As such, all the billing procedures and personal information can be handled solely by the subscription manager.

While this system puts a premium on user privacy, it also creates a difficulty for lawful interception procedures. In particular, an agency seeking lawful interception of communications by a specific user would typically be able to send an interception request with a user's name to an operator. The operator would have the user's name stored in their database and, thus, be able to look up the operator specific access code to their network that corresponds to the user's name. Then, the operator could grant lawful interception to the agency.

Now, the user information will be stored with the subscription manager (sometimes also called cloud provider or subscription broker) and the operator will likely not even know the user's name. Additionally, however, for lawful interception to occur, access to the operator's network must still be granted by the operator. As such, the agency can no longer simply send an interception request with a user's name to the operator, as the operator has no ability to match the operator specific access code with the user's name. Also, the device may have many subscriptions, hence there might be many operators that a LI agency would need to contact.

As such, embodiments of the present invention provide methods, apparatuses, and computer program products for lawful interception through a subscription manager. In some embodiments, methods, apparatuses, and computer program products provide user subscription data to an agency, operator, or service provider in response to receiving a lawful interception request.

In one example embodiment, a method may include receiving an interception request comprising a user's name from at least one operator. The method may further include determining, by a processor, an operator specific access code associated with the user's name. The method may also include providing the operator specific access code to the operator.

In another example embodiment, an apparatus comprising at least one processor and at least one memory storing computer program code, wherein the at least one memory and stored computer program code are configured, with the at least one processor, to receive an interception request comprising a user's name from at least one operator. The at least one memory and stored computer program code are configured, with the at least one processor, to further cause the apparatus of this example embodiment to determine an operator specific access code associated with the user's name. The at least one memory and stored computer program code are configured, with the at least one processor, to further cause the apparatus of this example embodiment to provide the operator specific access code to the operator.

In another example embodiment, a computer program product is provided. The computer program product of this example embodiment includes at least one computer-readable storage medium having computer-readable program instructions stored therein. The program instructions of this example embodiment comprise program instructions configured to cause an apparatus to perform a method comprising receiving an interception request comprising a user's name from at least one operator. The computer program product of this example embodiment further comprises determining an operator specific access code associated with the user's name. The computer program product of this example embodiment additionally comprises providing the operator specific access code to the operator.

In another example embodiment, an apparatus is provided. The apparatus comprises a means for receiving an interception request comprising a user's name from at least one operator. The apparatus may also comprise a means for determining an operator specific access code associated with the user's name. The apparatus may further comprise a means for providing the operator specific access code to the operator.

BRIEF DESCRIPTION OF THE DRAWINGS

Figure 1:
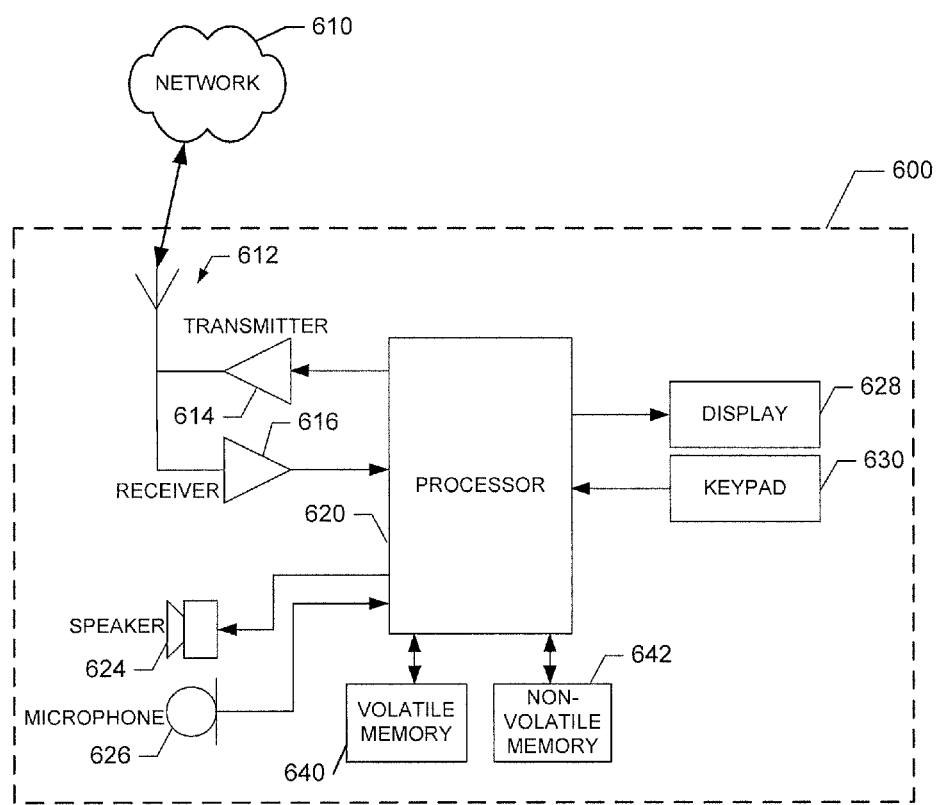
Figure 2:
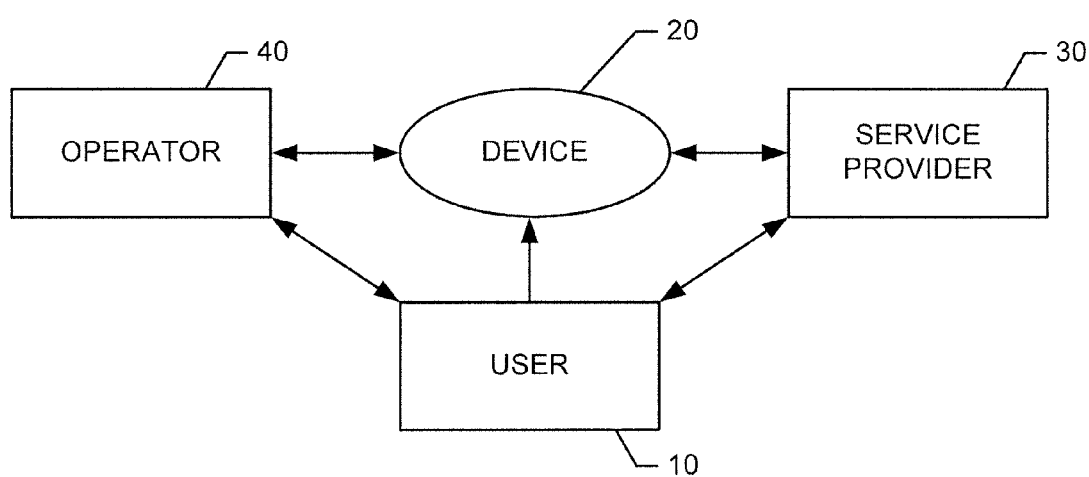
Figure 3:
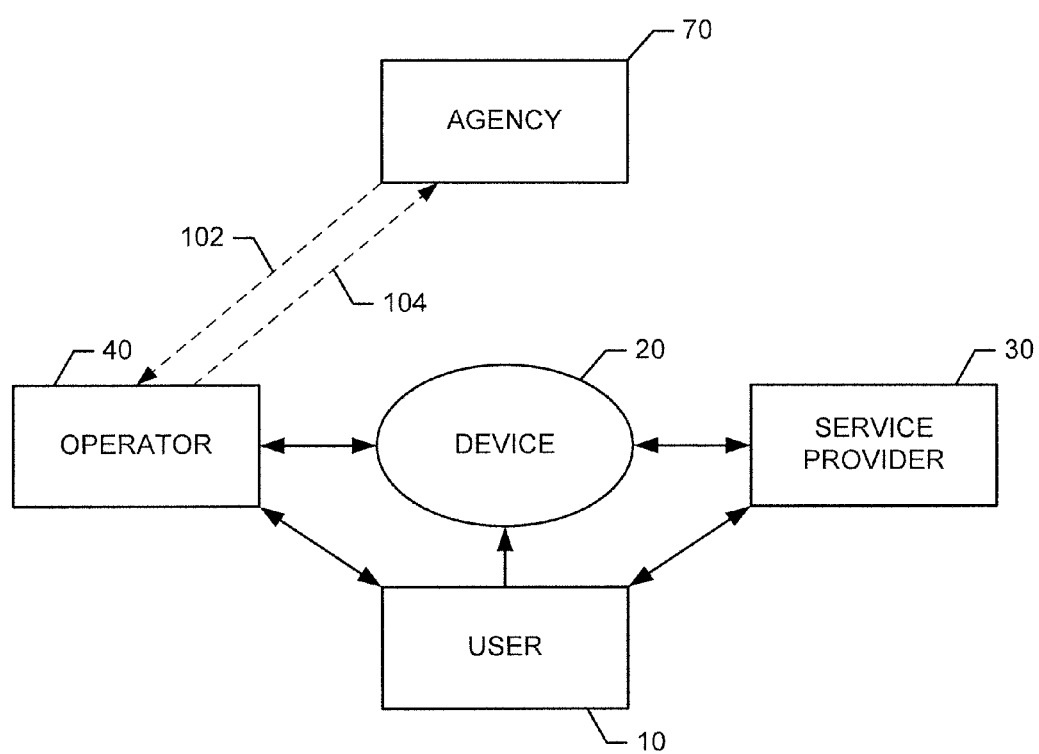
Figure 4:
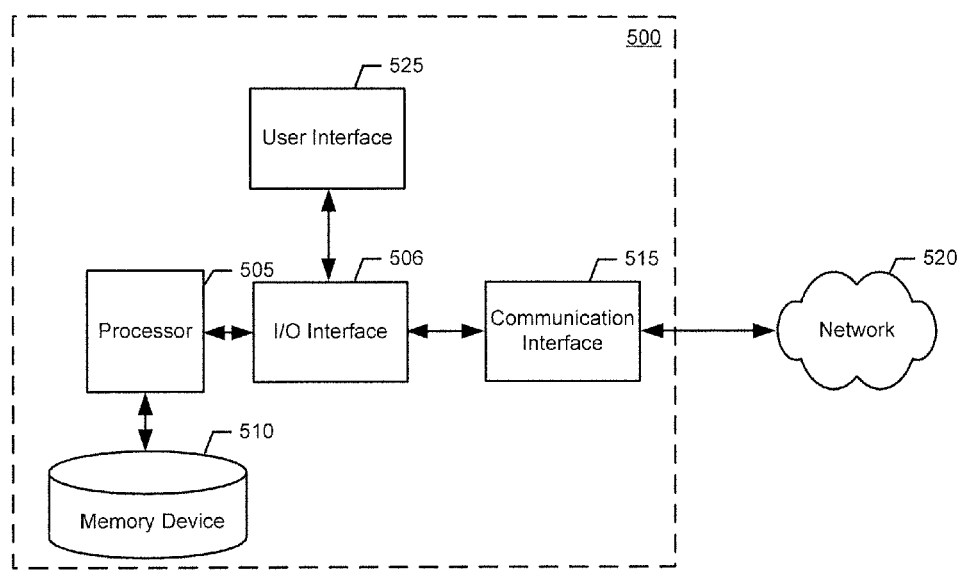
Figure 5:
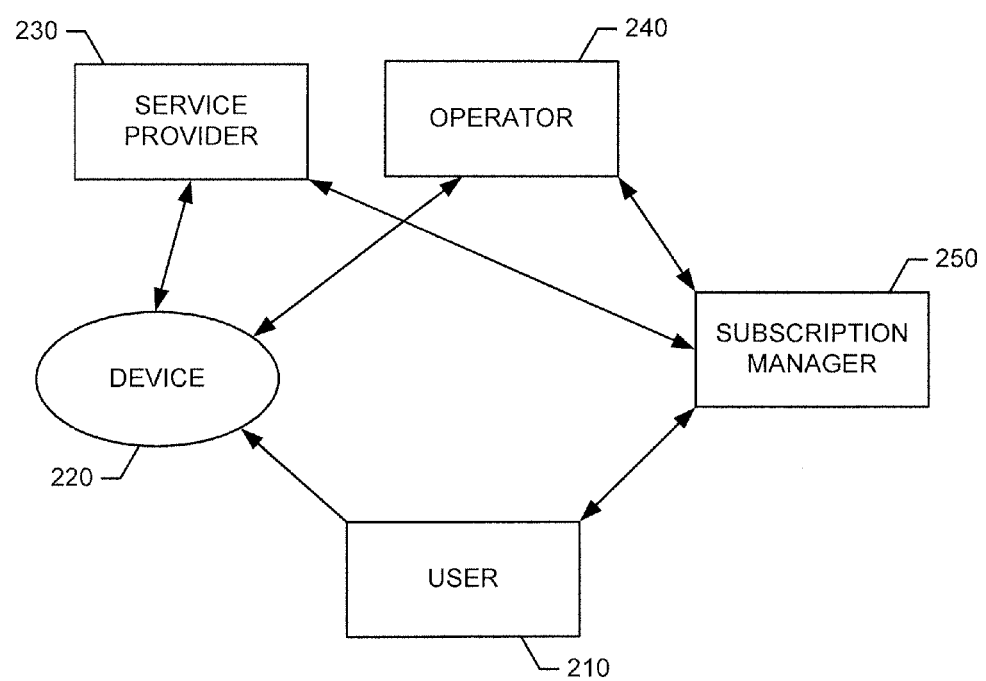
Figure 6:
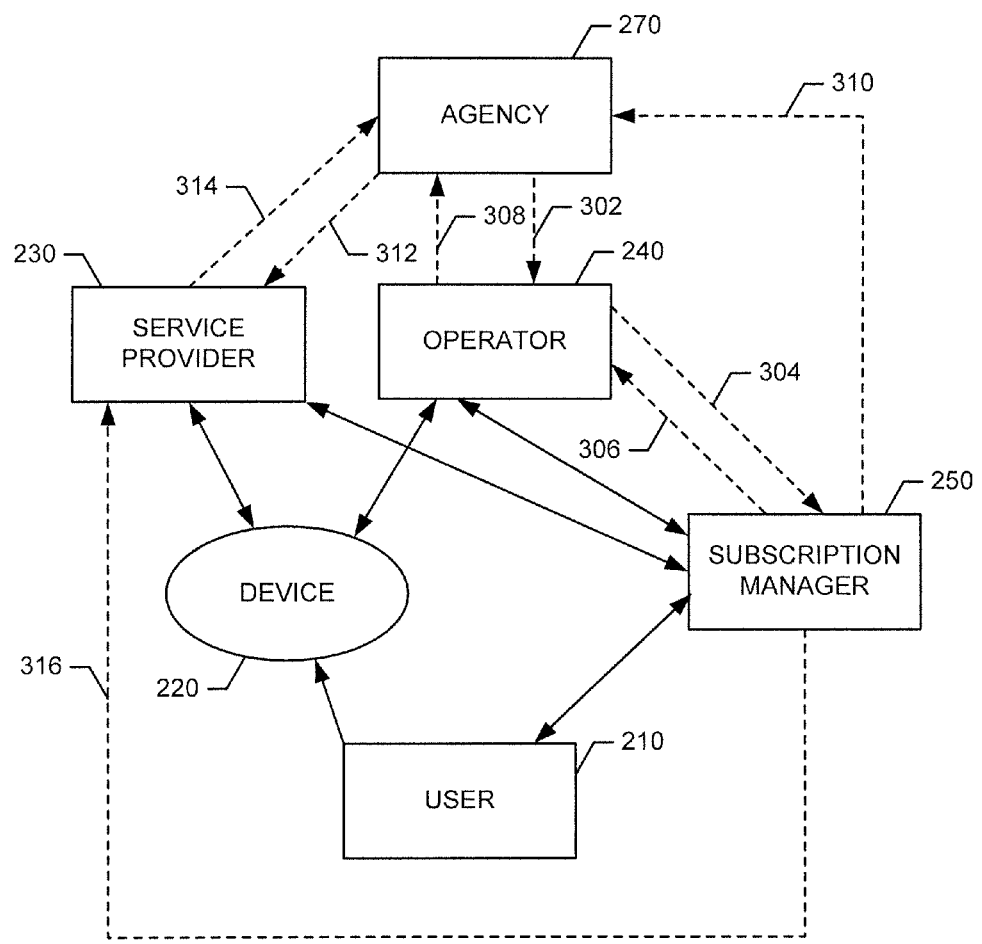
Figure 7:
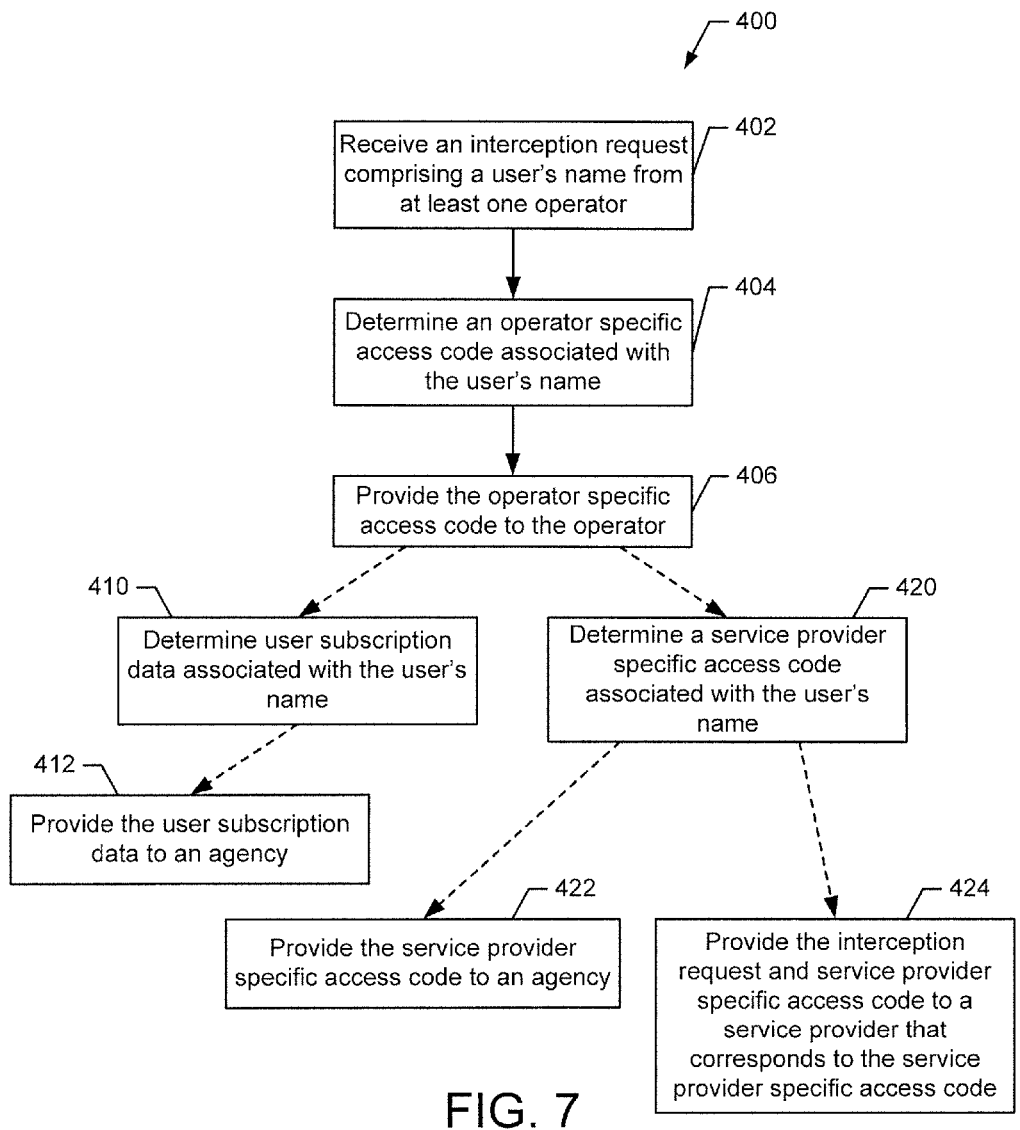

Having thus described embodiments of the invention in general terms, reference will now be made to the accompanying drawings, which are not necessarily drawn to scale, and wherein:

FIG. 1 illustrates a block diagram of an apparatus that facilitates access to a network for a user, in accordance with some embodiments described herein;

FIG. 2 illustrates a block diagram of a system for granting access to a network for an apparatus, such as the apparatus illustrated in FIG. 1, in accordance with some embodiments described herein;

FIG. 3 illustrates a block diagram of a current system and method for granting lawful interception, such as with the system illustrated in FIG. 2, in accordance with some embodiments described herein;

FIG. 4 is a schematic block diagram of a subscription manager, in accordance with some embodiments described herein;

FIG. 5 illustrates a block diagram of a system for granting access to a network for an apparatus through a subscription manager, in accordance with some embodiments described herein;

FIG. 6 illustrates a block diagram of a system and method for granting lawful interception, such as with the system illustrated in FIG. 5, in accordance with some embodiments described herein; and FIG. 7 illustrates a flowchart according to an example method for lawful interception through a subscription manager, in accordance with some embodiments described herein.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments of the present invention, to refer to data capable of being transmitted, received, operated on, and/or stored.

The term "computer-readable medium" as used herein refers to any medium configured to participate in providing information to a processor, including instructions for execution. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

As used herein, the term 'circuitry' refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

Wireline and wireless networks offer users the ability to interact with each other even across vast distances. These networks provide communication and interaction capabilities (e.g., voice, chat, email, etc.) to a user through devices such as phones or computers.

FIG. 1 illustrates a block diagram of an apparatus 600 (e.g., phone, computer, etc.) for facilitating interaction between a user and a wireline and/or wireless network 610. It will be appreciated that the apparatus 600 is provided as an example of one embodiment and should not be construed to narrow the scope or spirit of the invention in any way. In this regard, the scope of the disclosure encompasses many potential embodiments in addition to those illustrated and described herein.

The apparatus 600 may be embodied as a desktop computer, laptop computer, mobile terminal, mobile computer, mobile phone, mobile communication device, game device, digital camera/camcorder, audio/video player, television device, radio receiver, digital video recorder, positioning device, a chipset, a computing device comprising a chipset, any combination thereof, and/or the like. In the depicted embodiment, the apparatus 600 is embodied as a mobile computing device, such as the mobile terminal 600. It should be understood, however, that the mobile terminal 600 illustrated and hereinafter described is merely illustrative of one type of apparatus. Other examples of apparatuses mobile telephones, mobile computers, personal digital assistants (PDAs), pagers, laptop computers, desktop computers, gaming devices, televisions, e-papers, and other types of electronic systems.

As shown, the mobile terminal 600 may include an antenna 612 (or multiple antennas 612) in communication with a transmitter 614 and a receiver 616. The mobile terminal 600 may also include a processor 620 configured to provide signals to and receive signals from the transmitter and receiver, respectively. These signals sent and received by the processor 620 may include signaling information in accordance with an air interface standard of an applicable cellular system, and/or any number of different wireline or wireless networking techniques.

The mobile terminal 600 may also comprise a user interface including, for example, an earphone or speaker 624, a ringer 622, a microphone 626, a display 628, a user input interface, and/or the like, which may be operationally coupled to the processor 620. As such, a user may use the mobile terminal 600 to access various wireline and/or wireless networks 610.

The mobile terminal 600 may also comprise memory. The mobile terminal 600 may include volatile memory 640 and/or non-volatile memory 642. For example, volatile memory 640 may include Random Access Memory (RAM) including dynamic and/or static RAM, on-chip or off-chip cache memory, and/or the like. Non-volatile memory 642, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 640 non-volatile memory 642 may include a cache area for temporary storage of data. The memories may store one or more software programs, instructions, pieces of information, data, and/or the like which may be used by the mobile terminal for performing functions of the mobile terminal.

Additionally or alternatively, each device, such as mobile terminal 600, may be embedded with a subscriber identity module (SIM), a secure System on Chip (SoC), an embedded UICC, a removable user identity module (R-UIM), and/or the like, which may store information elements related to a mobile subscriber access related data (e.g., a user that has subscribed to a mobile network operator). In particular, the element stores network access credentials, configuration data and algorithms for one or several access networks from one or different access network providers. In some embodiments, the SIM is an integrated circuit that securely stores subscriber information and is used to identify a subscriber. In particular, the SIM may be configured to store information used to authenticate and identify subscribers on the network. For example, each SIM may be configured to store a SIM identifier, such as an international integrated circuit card identifier (ICCID). The SIM identifier is specific to that SIM and enables international identification of the SIM. The SIM may also be configured to store network information or user subscription data, such as an international mobile subscriber identity (IMSI), authentication key, location area identity, operator-specific emergency number, and mobile subscriber integrated services digital network number (MSISDN). The target device might be identified via the ICC_IS, MSISDN, IMSI or International Mobile Equipment Identity (IMEI).

Devices used to facilitate access to a network for a user, such as mobile terminal 600, may often be manufactured in bulk and later purchased by a user. At manufacture and subsequent purchase or acquisition by a user the embedded SIM may only comprise a SIM identifier that is specific to that device and/or SIM. As such, while the device may have the capability to access networks, the device may not be configured with the proper access codes to operate on those networks. As such, the device may be later provisioned in order enable access to a network.

FIG. 2 illustrates a block diagram of a current system for provisioning a device 20, such as the mobile terminal 600 shown in FIG. 1. With reference to FIG. 2, a user 10 may purchase or otherwise acquire a device 20. The user 10 may wish to access a network, such as enable cellular communication. However, as indicated above, the device 20 will not be able to access the functionality of the network without permission of an operator 40 and/or service provider 30.

For example, if a user 10 wishes to enable cellular communication access for a device 20, the user 10 may contact an operator 40 (e.g., a mobile network operator (MNO)). The operator 40 may form a license or contract (e.g., subscription) with the user 10 to allow cellular communication through their network for the device 20. In particular, the user 10 may give the operator 40 identification and billing information (e.g., name, address, credit card, etc.). In exchange, the user 10 may receive access to the operator's network for cellular communication, enabling phone calls and other functions.

The operator 40 may also receive a device identifier, such as the SIM identifier, from the user 10. This may occur by prompting the user and/or receiving the device identifier when the user contacts the operator with that device 20. The operator 40 then contacts the device 20 with the device identifier and assigns an operator specific access code (e.g., IMSI, MSISDN, etc.) to the device 20 and/or SIM of the device 20. The operator specific access code is stored on the device 20 and enables use of the operator's network. Thus, under the current provisioning system, the operator 40 maintains and/or stores user subscription data, such as the device identifier, user's name, and corresponding operator specific access code.

Similarly, a user 10 may enable applications or other types of network features (e.g., email, chat, facebook, etc.) through a service provider 30 (e.g., google, msn, etc.). The service provider 30 may form a license or contract (e.g., subscription) with the user 10 to allow access to their network/applications for the device 20. In particular, the user 10 may give the service provider 30 identification and billing information (e.g., name, address, credit card, etc.). In exchange, the user 10 may receive access to the service provider's network and/or applications, enabling functionality on the network.

The service provider 30 may also receive a device identifier, such as the SIM identifier, from the user 10 (e.g., by prompting the user and/or receiving the device identifier when the user contacts the service provider with that device 20). The service provider 30 then contacts the device 20 with the device identifier and assigns a service provider specific access code (e.g., IMSI, MSISDN, etc.) to the device 20 and/or SIM of the device 20. The service provider specific access code is stored on the device 20 and enables use of the service provider's network and/or applications. Thus, under the current provisioning system, the service provider 30 maintains and/or stores user subscription data, such as the device identifier, user's name, and corresponding service provider specific access code.

Though FIG. 2 illustrates one operator 40 and one service provider 30, devices, such as device 20, may have subscriptions to multiple operators and/or service providers for many different types of functionality. Each operator may therefore assign a different operator specific access code to the device 20 to enable it to access the operator's network. Likewise, each service provider may assign a different service provider access code to the device 20 to enable it to access the service provider's network.

Once a user 10 has access to a network, such as through an operator and/or service provider, the user 10 can utilize the device 20 to access functionality on a network (e.g., place a phone call, send an email, etc.). As such, the user 10 is free to share information over the network.

In some circumstances, an agency, such as a government agency (e.g., CIA, FBI, etc.) may wish to monitor network communications of a specific individual or user. For example, the user may be of interest to national security or may be wanted for a crime. In such a circumstance, the agency may have to comply with the governing law in order to obtain the right to lawfully intercept a user's communication or interaction over a network. Once cleared, the agency will need to contact the operator to perform the lawful interception.

FIG. 3 illustrates a block diagram of a current method for obtaining lawful interception of the interactions of a user 10 through a device 20. In the depicted embodiment, the agency 70 provides a user's name to an operator 40 at operation 102. In some embodiments, the agency 70 may also provide an interception request that includes the user's name. After receiving the interception request, the operator 40 may perform the legal steps necessary to authenticate and/or approve the request, such as may be consistent with the legal process for the country. Once the request is approved, the operator 40 may access its records/databases for the stored user subscription data. Using the user's name, the operator will be able to identify the operator specific access code that corresponds to the user's name. Additionally or alternatively, the operator 40 may also be configured identify the device identifier that corresponds to the user's name and operator specific access code. Then, using the operator specific access code, the operator 40 will enable lawful interception of the user's interactions through the device 20 over the operator's network for the agency at operation 104. Often, lawful interception includes providing copies and/or logs of the communication and/or interaction by the user to the agency. In some cases, however, the agency may be able to directly monitor the user's communication and/or interactions over the operator's network.

As noted herein, the device 20 may include multiple subscriptions to other operators. Currently, an agency may be configured to request lawful interception from multiple operators, by providing the user's name to those operators. With reference to the above description regarding operator 40, those additional operators 40 may also provide lawful interception for the communications and/or interactions by the user on their specific network. An example of a specific procedure for lawful interception can be found in ETSI Standards for 2006, entitled "Lawful Interception (LI); Handover interface for the lawful interception of telecommunications traffic," which is hereby incorporated by reference in its entirety.

The complexity presented with devices having multiple subscriptions for different networks and functions, a new entity has arisen that can manage some or all of the subscriptions for a user and a device. In particular, a subscription manager can maintain user subscription data and enable access to different networks for the device through different operators and/or service providers. In some embodiments, as described in greater detail below, the user can contact the subscription manager to enable access to different operators. In some cases, the user may not even be aware of which operator network and/or service provider network their device is accessing.

Referring now to FIG. 4, an example embodiment of a subscription manager is depicted as apparatus 500. In some example embodiments, the apparatus 500 may, be embodied as, or included as a component of, an electronic computing device. Apparatus 500 may or may not be configured to perform wired and/or wireless communications. In some example embodiments, the apparatus 500 may be part of a device, such as a stationary or a mobile communications terminal. As a mobile device, the apparatus 500 may be a mobile and/or wireless communications node such as, for example, a computer, a server, an access point, a handheld wireless device (e.g., telephone, smart phone, portable digital assistant (PDA), mobile television, digital book reader, tablet device, gaming device, camera, video recorder, audio/video player (e.g., CD/DVD player), radio, and/or a global positioning system (GPS) device), any combination of the aforementioned, or the like.

FIG. 4 illustrates a block diagram of example components of the apparatus 500. The example apparatus 500 comprises or is otherwise in communication with a processor 505, a memory device 510, and an Input/Output (I/O) interface 506. In some example embodiments, the apparatus 500 also includes a user interface 525, and a communications interface 515. The processor 505 may, according to some example embodiments, be embodied as various means for implementing the various functionalities of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, processor 505 may be representative of a plurality of processors, or one or more multiple core processors, operating in concert. Further, the processor 505 may be comprised of a plurality of transistors, logic gates, a clock (e.g., oscillator), other circuitry, and the like to facilitate performance of the functionality described herein. The processor 505 may, but need not, include one or more accompanying digital signal processors. In some example embodiments, the processor 505 is configured to execute instructions stored in the memory device 510 or instructions otherwise accessible to the processor 505. The processor 505 may be configured to operate such that the processor causes or directs the apparatus 500 to perform various functionalities described herein.

Whether configured as hardware or via instructions stored on a computer-readable storage medium, or by a combination thereof, the processor 505 may be an entity and means capable of performing operations according to embodiments of the present invention while configured accordingly. Thus, in example embodiments where the processor 505 is embodied as, or is part of, an ASIC, FPGA, or the like, the processor 505 is specifically configured hardware for conducting the operations described herein. Alternatively, in example embodiments where the processor 505 is embodied as an executor of instructions stored on a computer-readable storage medium, the instructions specifically configure the processor 505 to perform the algorithms and operations described herein. In some example embodiments, the processor 505 is a processor of a specific device (e.g., a communications server or mobile device) configured for employing example embodiments of the present invention by further configuration of the processor 505 via executed instructions for performing the algorithms, methods, and operations described herein.

The memory device 510 may be one or more tangible and/or non-transitory computer-readable storage media that may include volatile and/or non-volatile memory. In some example embodiments, the memory device 510 comprises Random Access Memory (RAM) including dynamic and/or static RAM, on-chip or off-chip cache memory, and/or the like. Further, memory device 510 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 510 may include a cache area for temporary storage of data. In this regard, some or all of memory device 510 may be included within the processor 505. In some example embodiments, the memory device 510 may be in communication with the processor 505 and/or other components via a shared bus.

Further, the memory device 510 may be configured to store information, data, applications, computer-readable program code instructions, and/or the like for enabling the processor 505 and the example apparatus 500 to carry out various functions in accordance with example embodiments of the present invention described herein. For example, the memory device 510 may be configured to buffer input data for processing by the processor 505. Additionally, or alternatively, the memory device 510 may be configured to store instructions for execution by the processor 505.

The I/O interface 506 may be any device, circuitry, or means embodied in hardware, software, or a combination of hardware and software that is configured to interface the processor 505 with other circuitry or devices, such as the communications interface 515. In some example embodiments, the I/O interface may embody or be in communication with a bus that is shared by multiple components. In some example embodiments, the processor 505 may interface with the memory 510 via the I/O interface 506. The I/O interface 506 may be configured to convert signals and data into a form that may be interpreted by the processor 505. The I/O interface 506 may also perform buffering of inputs and outputs to support the operation of the processor 505. According to some example embodiments, the processor 505 and the I/O interface 506 may be combined onto a single chip or integrated circuit configured to perform, or cause the apparatus 500 to perform, various functionalities of the present invention.

In some embodiments, the apparatus 500 or some of the components of apparatus 500 (e.g., the processor 505 and the memory device 510) may be embodied as a chip or chip set. In other words, the apparatus 500 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 500, or particular components of the apparatus 500, may therefore, in some cases, be configured to implement embodiments of the present invention on a single chip or as a single "system on a chip." As such, in some cases, a chip or chipset may constitute means for performing the functionalities described herein and with respect to the processor 505.

The communication interface 515 may be any device or means embodied in hardware, a computer program product, or a combination of hardware and a computer program product that is configured to receive and/or transmit data from/to a network 520 and/or any other device or module in communication with the example apparatus 500.

The communications interface may be configured to communicate information via any type of wired or wireless connection, and via any type of communications protocol, such as a communications protocol that supports cellular communications. According to various example embodiments, the communication interface 515 may be configured to support the transmission and reception of communications in a variety of networks including, but not limited to Internet Protocol-based networks (e.g., the Internet), cellular networks, or the like. Further, the communications interface 515 may be configured to support device-to-device communications. Processor 505 may also be configured to facilitate communications via the communications interface 515 by, for example, controlling hardware included within the communications interface 515. In this regard, the communication interface 515 may include, for example, communications driver circuitry (e.g., circuitry that supports wired communications via, for example, fiber optic connections), one or more antennas, a transmitter, a receiver, a transceiver and/or supporting hardware, including, for example, a processor for enabling communications. Via the communication interface 515, the example apparatus 500 may communicate with various other network entities in a device-to-device fashion and/or via indirect communications via a base station, access point, server, gateway, router, or the like.

The user interface 525 may be in communication with the processor 505 to receive user input via the user interface 525 and/or to present output to a user as, for example, audible, visual, mechanical, or other output indications. The user interface 525 may include, for example, a keyboard, a mouse, a joystick, a display (e.g., a touch screen display), a microphone, a speaker, camera, accelerometer, or other input/output mechanisms. Further, the processor 505 may comprise, or be in communication with, user interface circuitry configured to control at least some functions of one or more elements of the user interface. The processor 505 and/or user interface circuitry may be configured to control one or more functions of one or more elements of the user interface through computer program instructions (e.g., software and/or firmware) stored on a memory accessible to the processor 505 (e.g., volatile memory, non-volatile memory, and/or the like). The user interface 525 may also be configured to support the implementation of haptic feedback. In this regard, the user interface 525, as controlled by processor 505, may include a vibra, a piezo, and/or an audio device configured for haptic feedback as described herein. In some example embodiments, the user interface circuitry is configured to facilitate user control of at least some functions of the apparatus 500 through the use of a display and configured to respond to user inputs. The processor 505 may also comprise, or be in communication with, display circuitry configured to display at least a portion of a user interface, the display and the display circuitry configured to facilitate user control of at least some functions of the apparatus 500.

In some embodiments, the processor 505 may be configured to receive information from a user, such as information indicative of a request for provisioning a subscription for a device. For example, a user may provide the subscription manager with user specific data (e.g., user's name, device identifier, billing information, etc.). The processor 505 may be configured to store the user specific data in the memory 510. In some embodiments, the memory 510 may associate the user specific data with user subscription data.

The processor 505 may also be configured to transmit and/or receive data from an operator and/or service provider. For example, the processor 505 may be configured to send some user specific data to the operator and/or service provider, such as a device identifier. The processor 505 may also be configured to receive some operator specific subscription data from the operator. Additionally or alternatively, the processor 505 may be configured to receive some service provider specific subscription data from the service provider. In some embodiments, the processor 505 may receive an operator specific access code and/or service provider specific access code associated with a device identifier. The processor 505 may be configured to store the operator specific access code and/or service provider specific access code with the corresponding user subscription data in the memory 510. Moreover, in some embodiments, the processor 505 may be configured to transmit the operator specific access code and/or service provider specific access code to the associated device. In such a manner, the device may receive the operator specific access code and/or service provider specific access code and be enabled to access the corresponding operator and/or service provider network/applications.

In some embodiments, the processor 505 may be configured to access at least some of the user subscription data from the memory 510. In some embodiments, the user subscription data may comprise a user's name and at least one associated device identifier. In various embodiments, the user subscription data may also comprise at least one operator specific access code. In some embodiments, the user subscription data may comprise multiple operator specific access codes for one or more operators. Additionally or alternatively, the user subscription data may comprise at least one service provider specific access code. In some embodiments, the user subscription data may comprise multiple service provider specific access codes for one or more service providers. In some embodiments, the user subscription data may comprise other user specific data (e.g., billing information, credit cards, etc.).

The processor 505 may also be configured to receive an interception request from at least one operator and/or service provider. The processor 505 may be configured to receive a user's name with the interception request. In response, the processor may be configured to access the user subscription data and determine at least one operator specific access code associated with the user's name. In some embodiments, the processor 505 may be configured to access the user subscription data and determine at least one service provider specific access code associated with the user's name. Additionally, in some embodiments, the processor 505 may be configured to send or provide the at least one operator specific access code and/or at least one service provider specific access code associated with the user's name to the operator and/or service provider.

Moreover, in some embodiments, the processor 505 may be configured to determine at least one operator and/or service provider specific access code different than the operator and/or service provider from which the interception request was received. In such an embodiment, the processor 505 may be further configured to send the interception request to that different operator and/or service provider. Moreover, in some embodiments, the processor 505 may be configured to send the different operator and/or service provider specific access code with the interception request to the different operator and/or service provider.

Additionally or alternatively, the processor 505 may be configured to transmit at least some user subscription data to an agency, such as a government agency. For example, the processor 505 may be configured to transmit the at least one different operator and/or service provider specific access code to the agency.

In some embodiments, the processor 505 may also be configured to manage the subscriptions of the user and the device with multiple operators and/or service providers. For example, the processor 505 may be configured to provision access to any number of operators and/or service providers for the device. Additionally, the processor 505 may be configured to handle billing of the user for the operators and/or service providers. As such, all the information and/or contact a user needs may be facilitated through the subscription manager.

Embodiments of the subscription manager, such as apparatus 500, described above, are useful for embodiments of the present invention. Additionally or alternatively, the subscription manager may include additional functionality such as that disclosed in ETSI Security Workshop entitled "Embedded SIMs and M2M Communications," presented by Michael Walker on Jan. 20, 2011, and ETSI TC SCP REQ ad hoc #113 entitled, "Proposal to Clarify and Expand eUICC Definitions," presented in London, GB on Apr. 27-28, 2011, which are each hereby incorporated by reference in their entireties.

The new model of using a subscription manager for management of a user's subscriptions may prove useful in many aspects. In particular, a subscription manager streamlines communication for a user, as the user need only contact the subscription manager for billing, account manager, and subscription inquiries. Additionally, the subscription manager enables provisioning of a device with multiple operators and/or service providers without the user needing to contact each individual operator and/or service provider. Moreover, the operator and/or service provider only needs the device identifier to provide a corresponding operator/service provider specific access code to enable access to the operator/service provider network for the device. This limits the user specific information that the operator/service provider has access too (e.g., the operator and/or service provider do not have access to a user's name).

FIG. 5 illustrates an example system for provisioning a device 220, such as the mobile terminal 600 shown in FIG. 1. With reference to FIG. 5, a user 210 may purchase or otherwise acquire a device 220. The user 210 may wish to access a network, such as enable cellular communication. However, the device 220 may not be able to access the functionality of the network without permission of an operator 240 and/or service provider 230.

If a user 210 wishes to enable cellular communication access for a device 220, the user 210 may now simply contact a subscription manager 250. The subscription manager 250 may form a license or contract (e.g., subscription) with the user 210 to allow cellular communication through a network for the device 220. In particular, the user 210 may give the subscription manager 250 identification and billing information (e.g., name, address, credit card, etc.). In exchange, the user 210 may receive access an operator's network for cellular communication, enabling phone calls and other functions. However, the user 210 may not know which operator 240 the device has access to the network through.

The subscription manager 40 may also receive a device identifier, such as the SIM identifier, from the user 210 (e.g., by prompting the user and/or receiving the identifier when the user contacts the subscription manager 250 with that device 220). The subscription manager 250 then contacts an operator 240 and transfers the device identifier to the operator 240 for enabling the device 220 to access that operator's network.

After the operator 240 receives the device identifier from the subscription manager 250, the operator 240 then contacts the device 220 and assigns an operator specific access code (e.g., IMSI, MSISDN, etc.) to the device 220 and/or SIM of the device 220. The operator specific access code is stored on the device 220 and enables use of the operator's network. Thus, under the new provisioning system, the operator 240 only maintains and/or stores a user's device identifier and the operator specific access code. As such, the operator 240 does not know the user's name and/or billing information. In some circumstances, the operator 240 can transfer the device identifier and corresponding operator specific access code back to the subscription manager 250 so that the subscription manager 250 can store such information with the user subscription data.

Similarly, a user 210 may enable applications or other types of network features (e.g., email, chat, facebook, etc.) through a service provider 230 (e.g., google, msn, etc.) by contacting the subscription manager 250. The subscription manager 250 will go through the same process with the service provider 230 to enable access for the device 220 on the service provider's network/application.

In particular, the service provider 230 may receive a device identifier, such as the SIM identifier, from the subscription manager 250. The service provider 230 then contacts the device 220 and assigns a service provider specific access code (e.g., IMSI, MSISDN, etc.) to the device 220 and/or SIM of the device 220. The service provider specific access code is stored on the device 220 and enables use of the service provider's network and/or applications. In some circumstances, the service provider 230 may transmit the service provider specific access code to the subscription manager 250 for storing with the user subscription data. Thus, under the new provisioning system, the service provider 230 only maintains and/or stores the device identifier and the service provider specific access code. As such, the service provider 230 does not know the user's name and/or billing information.

Though FIG. 5 illustrates one operator 240 and one service provider 230, devices, such as device 220, may have subscriptions to multiple operators and/or service providers for many different types of functionality. Each operator may therefore assign a different operator specific access code to the device 220 to enable it to access the operator's network. Likewise, each service provider may assign a different service provider access code to the device 220 to enable it to access the service provider's network. The subscription manager 250, as noted above can now communicate with each of these operators 240 and/or service providers 230 and store their corresponding operator/service provider specific access codes with the user subscription data.

While limiting the amount of information an operator and/or service provider may have may be beneficial for a user's privacy, it also creates a drawback for the current lawful interception system. In particular, when the agency (e.g., CIA, FBI, etc.) sends a lawful interception request to the operator, the operator doesn't have any user names and thus will not be able to provide an operator specific access code that corresponds to the user's name provided by the agency. In fact, the operator may not even know if the user that is named has an account with the operator. Moreover, while the information may be maintained with the subscription manager, the operator must still be the entity to grant permissible access to their network to the agency. As such, a new system for obtaining lawful interception must be contemplated for use with subscription managers.

FIG. 6 illustrates a block diagram of a system for obtaining lawful interception through a subscription manager. Embodiments of the present invention provide methods, apparatuses, and systems for obtaining lawful interception through a subscription manager, such as apparatus 500 described above with respect to FIG. 5.

In the depicted embodiment, the agency 270 provides a user's name to an operator 240 at operation 302. In some embodiments, the agency 270 may also provide an interception request that includes the user's name.

After receiving the interception request, the operator 240 may perform legal steps necessary to authenticate and/or approve the request, such as may be consistent with the legal process for the country. Once the request is approved, the operator 240, which may not have access to user names, may not be able to locate an operator specific access code that corresponds to the user's name. As such, the operator 240 may transmit the interception request, which may include the user's name, to the subscription manager 250 at operation 304.

The subscription manager 250 may receive the user's name and/or interception request with user's name from the operator 240. The subscription manager 250 may access its records such as through the stored user subscription data. Using the user's name, the subscription manager 250 may be configured to determine the operator specific access code that corresponds to the user's name. Additionally or alternatively, the subscription manager 250 may also be configured to determine the device identifier that corresponds to the user's name and operator specific access code. Then, the subscription manager 250 may be configured to send/provide the operator specific access code to the operator 240 at operation 306. In some embodiments, the subscription manager 250 may also provide the device identifier to the operator 240 at operation 306. Then, using the operator specific access code, the operator 240 may enable lawful interception of the user's communications and/or interactions through the device 220 over the operator's network for the agency at operation 308.

Additionally, the subscription manager 250 may be configured to provide at least some user subscription data to the agency at operation 310. In some embodiments, the at least some user subscription data may include billing information, the user address, or any other data stored under the user subscription data.

In some embodiments, the subscription manager 250 may also be configured to determine at least one other operator specific access code for at least one different operator. In some embodiments, the at least some user subscription data provided to the agency at operation 310 may include the other operator specific access code. In some embodiments, the at least some user subscription data may include multiple operator specific access codes.

Additionally or alternatively, the subscription manager 250 may also be configured to determine at least one other service provider specific access code for at least one different service provider. In some embodiments, the at least some user subscription data provided to the agency at operation 310 may include the other service provider specific access code. In some embodiments, the at least some user subscription data may include multiple service provider specific access codes.

In some embodiments, the agency 270 may receive the other operator/service provider specific codes and transmit the interception request to the corresponding service provider 230 and or other operator at operation 312. Then, using the operator/service provider specific access code, the service provider 230 and/or other operator may enable lawful interception of the user's interactions through the device 220 over the service provider's and/or operator's network for the agency at operation 308.

In some embodiments, the subscription manager 250 may be configured to send the interception request and/or other service provider/operator specific access codes to the service provider 230 and/or other operator directly at operation 316. Then, using the operator/service provider specific access code, the service provider 230 and/or other operator may enable lawful interception of the user's interactions through the device 220 over the service provider's and/or operator's network for the agency at operation 308. In some embodiments, the subscription manager 250 may comprise or be affiliated with the service provider 230 such that the subscription manager/service provider combination may permit lawful interception of a user's communications and/or interactions to the agency 270.

Embodiments of the present invention provide several advantages for the process of lawful interception with a subscription manager. For example, embodiments of the present invention provide an easy to implement solution to the privacy limitations presented by using a subscription manager. Additionally, embodiments of the present invention provide a streamlined process for full agency access to all user subscription data for a particular user and device. Moreover, embodiments of the present invention provide access to service provider networks and applications for use with lawful interception. As such, agencies can now monitor additional user interactions with networks (e.g., email, chat, facebook, etc.).

FIG. 7 illustrates a flowchart according to an example method for lawful interception through a subscription manager according to an example embodiment 400. The operations illustrated in and described with respect to FIG. 7 may, for example, be performed by, with the assistance of, and/or under the control of one or more of the processor 505, memory 510, communication interface 515, or user interface 525. Operation 402 may comprise receiving an interception request comprising a user's name from at least one operator. The processor 505, memory 510, communication interface 515, or user interface 525 may, for example, provide means for performing operation 402. Operation 404 may comprise determining an operator specific access code associated with the user's name. The processor 505, memory 510, communication interface 515, or user interface 525 may, for example, provide means for performing operation 404. Operation 406 may comprise providing the operator specific access code to the operator. The processor 505, memory 510, communication interface 515, or user interface 525 may, for example, provide means for performing operation 406.

In some embodiments, the method 400 may further comprise determining user subscription data associated with the user's name at operation 410. The processor 505, memory 510, communication interface 515, or user interface 525 may, for example, provide means for performing operation 410. Additionally, the method at operation 412 may further comprise providing the user subscription data to an agency. The processor 505, memory 510, communication interface 515, or user interface 525 may, for example, provide means for performing operation 412. In some embodiments, the user subscription data may include an operator specific access code that is specific to an operator that is different than the operator from which the interception request was received. In some embodiments, the user subscription data may comprise multiple operator specific access codes. Additionally or alternatively, the user subscription data may comprise at least one service provider specific access codes.

In some embodiments, the method 400 may further comprise determining a service provider specific access code associated with the user's name at Operation 420. The processor 505, memory 510, communication interface 515, or user interface 525 may, for example, provide means for performing operation 420. Additionally, the method may further comprise providing the service provider specific access code to an agency at operation 422. The processor 505, memory 510, communication interface 515, or user interface 525 may, for example, provide means for performing operation 422. In some embodiments, the method may further comprise providing the interception request and service provider specific access code to a service provider that corresponds to the service provider specific access code at operation 424. The processor 505, memory 510, communication interface 515, or user interface 525 may, for example, provide means for performing operation 424.

FIG. 7 illustrates a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 510) and executed by a processor in the computing device (for example, by the processor 505). In some embodiments, the computer program instructions comprising the computer program product(s) which embody the procedures described above may be stored by memory devices of a plurality of computing devices. As will be appreciated, any such computer program product may be loaded onto a computer or other programmable apparatus (for example, an apparatus 500) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, an apparatus 500) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (for example, the processor 505) may provide all or a portion of the elements. In another embodiment, all or a portion of the elements may be configured by and operate under control of a computer program product. The computer program product for performing the methods of an example embodiment of the invention includes a computer-readable storage medium (for example, the memory 510), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
    receiving, at a subscription manager, a lawful interception request from an operator node of a first operator, wherein the lawful interception request includes a name of a user associated with a mobile device, wherein the mobile device is configured to use a first subscription to access a first mobile network associated with the first operator, wherein the mobile device is further configured to use a second subscription to access a second mobile network associated with a second operator, wherein the subscription manager comprises at least one processor, at least one memory, and a network interface, wherein the network interface provides network communications to the operator node of the first operator, and wherein the subscription manager is configured to maintain the user's subscription data including the first subscription for accessing the first mobile network associated with the first operator and the second subscription for accessing the second mobile network associated with the second operator;
    determining, by the subscription manager, a first operator specific access code for the first mobile network and a second operator specific access code for the second mobile network, wherein the subscription manager determines the first operator specific access code and the second operator specific access code by at least retrieving, from the memory, a plurality of operator specific access codes corresponding to the name of the user;
    sending, to the operator node of the first operator, the first operator specific access code for the first mobile network to enable the first operator to intercept a first communication conducted by the mobile device via the first mobile network and to enable the first operator to provide, to an agency associated with the lawful interception request, the intercepted first communication; and
    sending, to an operator node of the second operator, the second operator specific access code for the second mobile network to enable the second operator to intercept a second communication conducted by the mobile device via the second mobile network and to enable the second operator to provide, to the agency associated with the lawful interception request, the intercepted second communication.

2. The method according to claim 1, further comprising:
    determining the user's subscription data for the first subscription and/or the second subscription; and
    providing, to the agency associated with the lawful interception request, the user's subscription data.

3. The method according to claim 2, wherein the agency comprises a law enforcement agency.

4. The method according to claim 1, wherein the first operator specific access code and/or the second operator specific access code are sent via the agency associated with the lawful interception request.

5. The method according to claim 1, further comprising:
    sending, to the operator node of the first operator and/or the operator node of the second operator, the lawful interception request.

6. The method according to claim 1, wherein the first operator specific access code and/or the second operator specific access code include at least one of an international mobile subscriber identity or a mobile subscriber integrated services digital network number.

7. An apparatus comprising:
    at least one processor;
    a network interface; and
    at least one memory including computer program code, the at least one processor, the at least one memory, and the computer program code configured to cause the apparatus to at least:
        maintain, by a subscription manager, a user's subscription data including a first subscription for accessing a first mobile network associated with a first operator and a second subscription for accessing a second mobile network associated with a second operator;
        receive, from an operator node of the first operator, a lawful interception request, wherein the lawful interception request includes a name of the user, wherein the user is associated with a mobile device, wherein the mobile device is configured to use the first subscription access the first mobile network associated with the first operator, wherein the mobile device is further configured to use the second subscription to access the second mobile network associated with the second operator, and wherein the apparatus communicates with the operator node of the first operator via the network interface;
        determine a first operator specific access code for the first mobile network and a second operator specific access code for the second mobile network by at least retrieving, from the at least one memory, a plurality of operator specific access codes corresponding to the name of the user;

send, to the operator node of the first operator, the first operator specific access code for the first mobile network to enable the first operator to intercept a first communication conducted by the mobile device communicating via the first mobile network and to enable the first operator to provide, to an agency associated with the lawful interception request, the intercepted first communication;

send, to an operator of the second operator, the second operator specific access code for the second mobile network to enable the second operator to intercept a second communication conducted by the mobile device via the second mobile network and to enable the second operator to provide, to the agency associated with the lawful interception request, the intercepted second communication.

8. The apparatus according to claim 7, wherein the apparatus is further caused to at least:

determine the user's subscription data for the first subscription and/or the second subscription; and provide, to the agency associated with the lawful interception request, the user's subscription data.

9. The apparatus according to claim 7, wherein the first operator specific access code and/or the second operator specific access code are sent via the agency associated with the lawful interception request.

10. The apparatus according to claim 7, wherein the apparatus is further caused to at least:

send, to the operator node of the first operator and/or the operator node of the second operator, the lawful interception request.

11. A non-transitory computer readable medium encoded with instructions that, when executed by at least one processor, cause operations comprising:

receiving, at a subscription manager, a lawful interception request from an operator node of a first operator, wherein the lawful interception request includes a name of a user associated with a mobile device, wherein the mobile device is configured to use a first subscription to access a first mobile network associated with the first operator, wherein the mobile device is further configured to use a second subscription to access a second mobile network associated with a second operator, wherein the subscription manager comprises at least one processor, at least one memory, and a network interface, wherein the network interface provides network communications to the operator node of the first operator, and wherein the subscription manager is configured to maintain the user's subscription data including the first subscription for accessing the first mobile network associated with the first operator and the second subscription for accessing the second mobile network associated with the second operator;

determining, by the subscription manager, a first operator specific access code for the first mobile network and a second operator specific access code for the second mobile network, wherein the subscription manager determines the first operator specific access code and the second operator specific access code by at least retrieving, from the memory, a plurality of operator specific access codes corresponding to the name of the user;

sending, to the operator node of the first operator, the first operator specific access code for the first mobile network to enable the first operator to intercept a first communication conducted by the mobile device via the first mobile network and to enable the first operator to provide, to an agency associated with the lawful interception request, the intercepted first communication; and sending, to an operator node of the second operator, the second operator specific access code for the second mobile network to enable the second operator to intercept a second communication conducted by the mobile device via the second mobile network and to enable the second operator to provide, to the agency associated with the lawful interception request, the intercepted second communication.

12. The non-transitory computer readable medium according to claim 11, further comprising:

determining the user's subscription data for the first subscription and/or the second subscription; and providing, to the agency associated with the lawful interception request, the user's subscription data.

13. The non-transitory computer readable medium according to claim 11, wherein the first operator specific access code and/or the second operator specific access code are sent via the agency associated with the lawful interception request.

14. The non-transitory computer readable medium according to claim 11, further comprising:

sending, to the operator node of the first operator and/or the operator node of the second operator, the lawful interception request.

* * * * *